R. A. SMITH.
RAILROAD TICKET.
APPLICATION FILED MAY 3, 1907.

922,818.

Patented May 25, 1909.
3 SHEETS—SHEET 1.

Fig. 1

CONTRACT

4. NEW YORK CENTRAL & HUDSON RIVER R. R.

FROM BUFFALO, N.Y., OR SUSPENSION BRIDGE, N. Y., TO DESTINATION BETWEEN PUNCH MARKS.

DESTINATION.

| | | | |
|---|---|---|---|
| CORNING, N.Y | NEW YORK, N.Y | | |
| CAYUGA, N.Y | NEWARK, O N.Y | ROCHESTER, N.Y | Williamsport, Pa |
| CANASTOTA, N.Y | LOCKPORT, N.Y | ROME, N.Y | Watertown, N.Y |
| Canandaigua, N.Y | ILION, N.Y | RHINECLIFF, N.Y | UTICA, N.Y |
| BATAVIA, N.Y | HERKIMER, N.Y | Poughkeepsie, N.Y | TROY, N.Y |
| AUBURN, N.Y | Gouverneur, N.Y | PALMYRA, N.Y | Tonawanda, N.Y |
| AMSTERDAM, N.Y | GENEVA, N.Y | OSWEGO, N.Y | SYRACUSE, N.Y |
| ALBANY, N.Y | DRESDEN, N.Y | Ogdensburg, N.Y | Schenectady, N.Y |
| * * * * | * * * * | * * * * | * * * * |

| | | | | | |
|---|---|---|---|---|---|
| NYC&HR RR. | C&NW-Chicago, | Tr, | MC-SuspBge, | NYC&HR to Dest |
| NYC&HR RR. | C&NW-Chicago, | Tr, | MC-Buffalo, | NYC&HR to Dest |
| NYC&HR RR. | C&NW-Chicago, | Tr, | LS&MS-Buffalo, | NYC&HR to Dest |
| NYC&HR RR. | C&NW-Chicago, | Tr, | GT-SuspBge, | NYC&HR to Dest |
| NYC&HR RR. | C&NW-Chicago, | Tr, | Erie-Buffalo, | NYC&HR to Dest |

ONE PASSAGE. NOT GOOD IF DETACHED
N. Y. C. & H. R. R. R. Conductors Punch Here.
First Class if Unpunched; otherwise, Second Class.

FORM — CHICAGO & NORTH-WESTERN RAILWAY CO. — Punch B.C. here.

---

3. Chicago to Buffalo or Suspension Bridge,
VIA RAILROAD SHOWN BELOW BETWEEN PUNCH MARKS.

Punch B.C. here.
First Class if Unpunched; otherwise, Second Class.

| | | | | |
|---|---|---|---|---|
| Erie to Buffalo. | C&NW-Chicago, | Tr, | Erie-Buffalo, | NYC&HR to Dest |
| GT to SuspB'ge. | C&NW-Chicago, | Tr, | GT-SuspBge, | NYC&HR to Dest |
| LS&MS to Buf'lo. | C&NW-Chicago, | Tr, | LS&MS-Buffalo, | NYC&HR to Dest |
| MC to Buffalo. | C&NW-Chicago, | Tr, | MC-Buffalo, | NYC&HR to Dest |
| MC to SuspB'ge. | C&NW-Chicago, | Tr, | MC-SuspBge, | NYC&HR to Dest |

DESTINATION.

| | | | |
|---|---|---|---|
| ALBANY, N.Y | DRESDEN, N.Y | Ogdensburg, N.Y | Schenectady, N.Y |
| AMSTERDAM, N.Y | GENEVA, N.Y | OSWEGO, N.Y | SYRACUSE, N.Y |
| AUBURN, N.Y | Gouverneur, N.Y | PALMYRA, N.Y | Tonawanda, N.Y |
| BATAVIA, N.Y | HERKIMER, N.Y | Poughkeepsie, N.Y | TROY, N.Y |
| Canandaigua, N.Y | ILION, N.Y | RHINECLIFF, N.Y | UTICA, N.Y |
| CANASTOTA, N.Y | LOCKPORT, N.Y | ROME, N.Y | Watertown, N.Y |
| CAYUGA, N.Y | NEWARK, O N.Y | ROCHESTER, N.Y | Williamsport, Pa |
| CORNING, N.Y | NEW YORK, N.Y | | |

ONE PASSAGE. NOT GOOD IF DETACHED.
Conductors Punch Here.

FORM — CHICAGO & NORTH-WESTERN RAILWAY CO.

Witnesses:
H. G. Barnett
Louis B. Erwin

Inventor
Robert A. Smith
By Rector, Kibben & Davis
His Attys

THE NORRIS PETERS CO., WASHINGTON, D. C.

R. A. SMITH.
RAILROAD TICKET.
APPLICATION FILED MAY 3, 1907.

922,818.

Patented May 25, 1909.

3 SHEETS—SHEET 2.

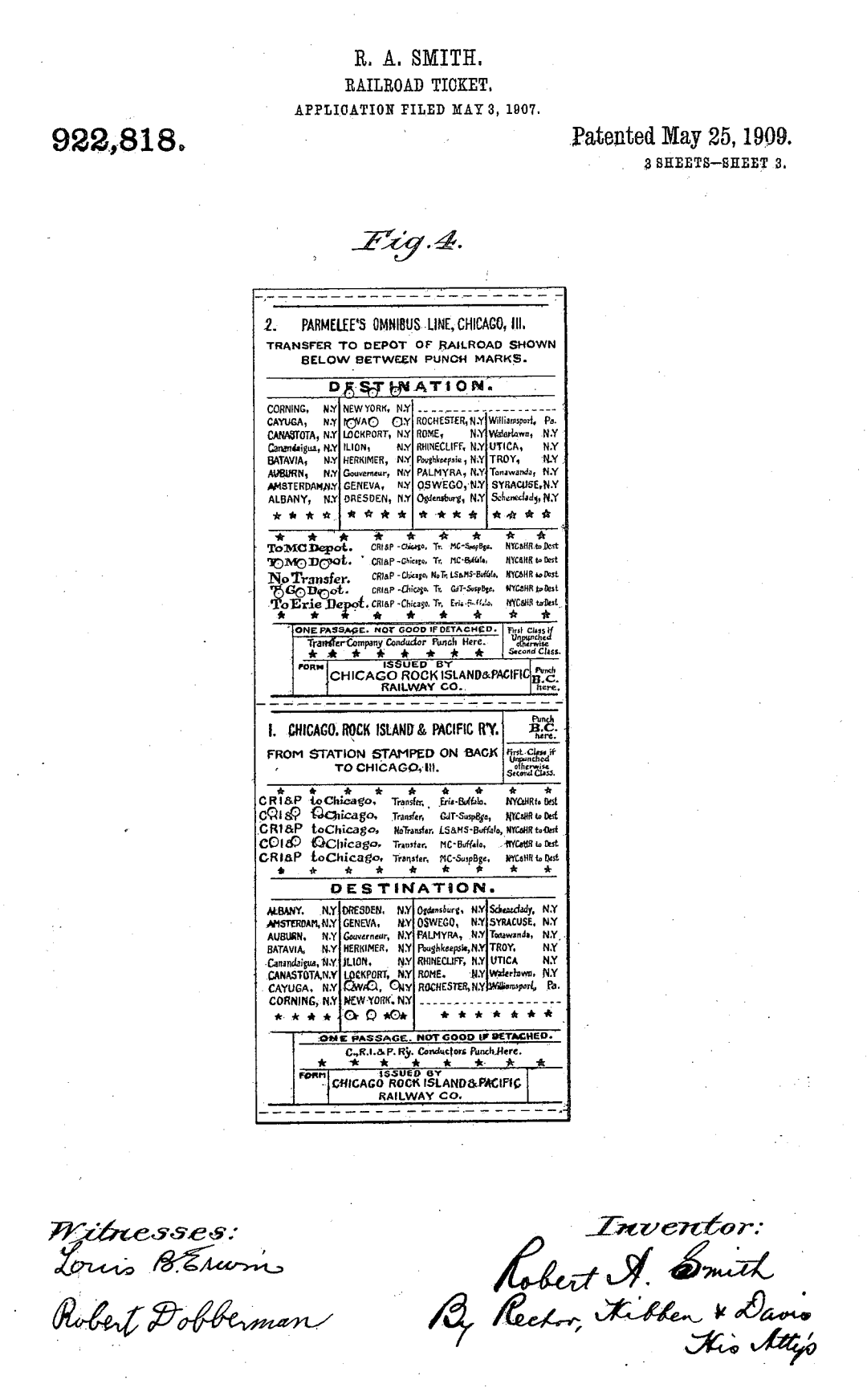

R. A. SMITH.
RAILROAD TICKET.
APPLICATION FILED MAY 3, 1907.

922,818.

Patented May 25, 1909.
3 SHEETS—SHEET 3.

Fig. 4.

UNITED STATES PATENT OFFICE.

ROBERT A. SMITH, OF OMAHA, NEBRASKA, ASSIGNOR OF THIRTY-SEVEN AND ONE-HALF ONE-HUNDREDTHS TO TOM C. DAVISON, OF LOS ANGELES, CALIFORNIA.

RAILROAD-TICKET.

No. 922,818.　　　Specification of Letters Patent.　　　Patented May 25, 1909.

Application filed May 3, 1907. Serial No. 371,683.

*To all whom it may concern:*

Be it known that I, ROBERT A. SMITH, a citizen of the United States, residing at Omaha, in the county of Douglas and State of Nebraska, have invented certain new and useful Improvements in Railroad-Tickets, of which the following is a specification.

My invention relates to railroad tickets and the object thereof is to provide a new form of ticket comprising a plurality of passage coupons and the usual coupons constituting agent's stub and auditor's advice and adapted to cover a plurality of through routes from a station on the line of the issuing or initial road, over any one of a plurality of intermediate or connecting lines and to a station or destination on a terminal line or lines of road, such coupons being provided or printed with the names of the initial and terminal line or lines of road and the intermediate or connecting lines of road in such manner that when the ticket is executed, each passage coupon distinctly and unalterably indicates in suitable manner, as between punch marks, the particular point to, and the name of the road over, which it is good, besides which each coupon, by preference, indicates the complete route of the ticket.

My new form of ticket, in its complete and preferable form, also comprises one or more transfer coupons adapted, when executed at the same time as the passage coupons, to indicate the depot to which such transfer coupon is good or the fact that no transfer is necessary if such is the case. By the provision of such a ticket the line of road over which and the junction point or station to which each coupon is good is distinctly and unalterably indicated and the reading of the coupon by each conductor is facilitated, besides which the ticket, in its complete and preferred form, exhibits the entire route for the benefit of the auditor of each line of road traveled by the passenger. Moreover, the transfer coupon or coupons also clearly indicate, as between punch marks, the particular depot to which the passenger is to be transferred (if any transfer is necessary) which indication is made by the same act of punching which takes place when the other coupons are executed, with the result that the agent executing the ticket is not required to know or to ascertain the fact whether a transfer is necessary or not and if necessary to what depot the transfer should be made good.

In the drawings I have illustrated one embodiment of my invention in which is illustrated one complete full sized ticket but severed into three parts to accommodate the two sheets of drawings.

Figure 1 represents the upper end of the ticket, the contract, however, not being printed, and contains passage coupons numbered 3 and 4; Fig. 2 represents passage coupon numbered 1 and transfer coupon numbered 4; Fig. 3 shows the two remaining coupons representing respectively the agent's stub and the advice to the auditor of the issuing or initial line of road; and Fig. 4 a modified form of ticket.

Before describing the details of my invention, it should be understood that my invention may be embodied in different forms of ticket and is not limited to the within illustrated and described form which is selected for the purpose of affording a clear understanding thereof.

As shown, the ticket selected for description comprises a plurality of passage coupons, one transfer coupon and the two other coupons representing the agent's stub and the advice to the auditor of the issuing or initial line or road. Moreover this ticket is a form adapted for use by an initial road selling tickets over any one of a plurality or group of intermediate or connecting lines of road, to any station on a single terminal line of road, although as hereinafter made apparent my invention may be embodied in other forms of ticket.

Referring to the drawings, the illustrative ticket therein comprises a coupon A representing the advice to the auditor of passenger accounts of the initial line of road, a second coupon B representing the selling agent's stub, a third coupon C which is the first passage coupon good for passage from the station on the back to the first junction point, a fourth coupon D which is a transfer coupon, a fifth coupon E which is the second passage coupon good for passage on one of the intermediate lines of road, and a sixth coupon F which is good for passage on the terminal line of road to the station or destination indicated between punch marks. It will be understood that the ticket has at the upper end at G the usual form of contract, etc., (not shown).

The first passage coupon C is provided at one side with the name of the issuing road and the name of the first junction point represented one above the other, in the present instance the matter represented being "C. & N. W. to Chicago," which as shown is printed five times at the left hand side of the coupon C. When the ticket is executed by punch marks punched through all of the coupons when folded together as hereinafter described, this passage coupon C is good for passage from the station on the Chicago and Northwestern Railway stamped on the back thereof to Chicago, it being evident that this coupon would indicate such route, whichever one of the five represented indications were included between the punch marks, these indications being repeated for a purpose hereinafter made apparent.

Referring next to the second passage coupon E, this coupon is good for passage from the junction point named in the first passage coupon (in the present instance Chicago) on any one of a group of intermediate or connecting lines which are printed in a position to correspond with the position of the name of the issuing line of road on the first passage coupon. In the present instance where the ticket is executed for a trip from a station on the Chicago and Northwestern Railway to New York city via Chicago, which is the terminal or junction point of said issuing line of road, the passenger has a choice of a plurality of lines of roads from Chicago to either Buffalo or Suspension Bridge, which represents the second junction point where connection is made with the New York Central and Hudson River Railroad, representing the terminal line of road which carries the passenger to the destination. Moreover, some of these intermediate lines of road run both to Buffalo and to Suspension Bridge. Consequently in the present form of ticket the names of the intermediate lines of road are followed by the junction points, either Buffalo or Suspension Bridge, as will be seen by examination of passage coupon E now being described.

Referring to the last passage coupon F, this coupon is provided at the left side with the name of the terminal line of road, to-wit "N. Y. C. & H. R. R.," represented five times and corresponding in position to the described route indications in passage coupons C and E. Inasmuch as the passage coupon E contains five route indications the name of the terminal line of road in passage coupon F is repeated a corresponding number of times and likewise in the passage coupon C the name of the initial line of road and the first junction point is repeated a similar number of times. It will be understood that these groups of route indications and names of initial and terminal lines of road are printed in a corresponding position on the different passage coupons with the result that when the ticket is folded with the coupons doubled upon each other all the coupons of the ticket may be executed by single punching acts.

In the present instance the name of the initial and terminal lines of road would be the same wherever the punch marks might be made in the groups of such indications and consequently it is necessary for the station agent, in executing the ticket, to determine the position of the particular punch marks now being referred to from the passage coupon E after ascertaining the choice of the intermediate line of road desired by the passenger. In the present instance this intermediate line of road is the Lake Shore and Michigan Southern Railway to Buffalo, and consequently the agent has punched the ticket so as to indicate on coupon E "L. S. & M. S. to Buf'lo," while the first passage coupon C indicates between punch marks "C. & N. W. to Chicago," and the last passage coupon F indicates merely the terminal line of road "N. Y. C. & H. R. R. R."

It will be noted that the group of indications above described appear distinctly inasmuch as they are printed in black bold faced type which facilitates the reading of the route of each passage coupon by the train conductor, who simply has to observe the group and the indication between the punch marks of his particular coupon, the other printed matter appearing on the other coupons being more especially for the convenience of the agent and auditor of the road, except that in passage coupon F the list of destinations is essential to indicate to the last train conductor the final destination of the passenger.

As shown from an inspection of Fig. 3, coupons A and B have the repeated indications "C. & N. W. to Chicago," in a position corresponding to the described groups of indications on the passage coupons, so that the agent's stub and auditor's advice will be executed by the same punching acts.

In the present instance and by preference each of the coupons has provision for indicating the complete route of the ticket, which route is indicated between punch marks when the ticket is executed. The complete route of the ticket is shown on each passage coupon in small type while the complete route of the coupon is shown on each of them in black bold face type. However, on the auditor's advice and agent's stub the complete route of the ticket is indicated between punch marks but the route is printed in ordinary or light type. As shown, each of the coupons is provided with a list of destinations on the terminal line of road, together with a blank space for filling in the name of a station or destination not printed thereon. Such coupons are also provided to the right of the described route indications with an indication of the complete route; for instance, passage coupon D contains the described repeated indication "C. & N. W. to Chicago," and on the same line but in less conspicuous type the indications "Transfer, Erie—Buffalo, N. Y. C. & H. R. to Dest.", meaning that if the ticket was executed so as to refer to the first line "C. & N. W. to Chicago" the complete ticket would show that the route was from a station on the Chicago and Northwestern Railway to the first junction point, which is Chicago, thence by the Erie Railroad to the second junction point, Buffalo, and finally by the N. Y. C. & H. R. R. R. to the destination.

In the present form of ticket, as executed, the first passage coupon C shows that the ticket is good for passage on the Chicago & Northwestern Railway to Chicago, on the Lake Shore and Michigan Southern Railway to Buffalo, and thence on the New York Central and Hudson River Railway to the destination, which is New York city. The group of intermediate lines of road and the junction points thereof appearing in this less conspicuous type on all of the coupons, corresponds to the similar group of indications appearing in conspicuous and bold-faced type on passage coupon E, so that when the ticket is executed in proper manner as to the latter coupon the lines of road and route are simultaneously and automatically punched in all of the other coupons.

In the present instance the ticket form covers the routes beginning on the initial line of road to a single junction point, to-wit Chicago, and terminating on a single terminal line of road, but it will be obvious from the description hereinbefore given that different junction points might be indicated and also that a plurality of terminal lines of road might be indicated, the name of the particular junction and the name of the particular terminal line of road selected always appearing correctly between punch marks.

Because of the fact that transfers from one railroad depot to another are required at some junction points, it becomes desirable to provide a ticket of this character with a transfer coupon which is to be taken up or lifted by the omnibus or transfer company giving such service and in the present form of ticket I have provided one transfer coupon for a transfer from one depot to another at the first junction point, Chicago, but it will be understood that a ticket may be provided with additional transfer coupons in case transfers were required at any other junction points. As shown this transfer coupon D is arranged between the coupons C and E and is provided with through route indications similar to the other coupons. However, the indications which are made conspicuous and are of value to the transfer company are the names of the different depots in Chicago of the different lines of road represented on the ticket, the name of the Michigan Central being, however, duplicated owing to the fact that the name of this road is duplicated on passage coupon E because it runs to both junction points, Buffalo and Suspension Bridge. This group of names of the Chicago depots on the transfer coupon is printed in a position corresponding to the other conspicuous groups of indications on the other passage coupons with the result that the transfer coupon is properly punched simultaneously and automatically with the punching of the route indications on the other coupons. Consequently the particular depot to which the passenger is to be transferred is accurately indicated by the act itself of punching the other coupons without any thought or labor at all on the part of the agent executing the ticket. In the particular form of ticket being described, the punching of the ticket for the particular route selected by the passenger causes the L. S. & M. S. to be indicated between the punch marks on the transfer coupon so that such coupon becomes good for a transfer from the Chicago and Northwestern depot at Chicago to the Lake Shore and Michigan Southern depot in such city.

It so happens that in the particular form of ticket described a transfer is necessary whichever intermediate route may be selected by the passenger, inasmuch as the Chicago and Northwestern Railway has its own depot and all of the intermediate lines depart from other depots, consequently the word "Transfer" is repeated in a group on each coupon and the transfer coupon contains five depot indications. However, in case a transfer should not be necessary, as would be the case if the initial line of road was different, the words "No transfer" would be printed, instead of the name of a depot on the transfer coupon in a proper position corresponding with the conspicuous route indications on the coupon E so that when the ticket is executed the words "No transfer" would appear between punch marks on the transfer coupon in all cases where two connecting lines use the same depot.

As an illustration, assume that the initial line of road is the Rock Island railroad, and that the first junction point is Chicago as before. In such case the transfer coupon, instead of having the indication to the L. S. & M. S. depot now appearing between the punch marks, would have the words "No transfer" inasmuch as the Rock Island road and the Lake Shore and Michigan Southern road use the same depot in Chicago. Such modified arrangement is made apparent by the two coupons illustrated in Fig. 4 of the drawings and forming part of a complete ticket. By this means the transfer coupon is capable of showing in absolute and unalterable manner between punch marks to which particular depot the passenger is to be transferred or the fact that no transfer is necessary where the same depot is used by two connecting roads.

It will be understood that the words "No transfer" take the place of the word "Transfer" in the through route indications appearing in the light type in all of the coupons except the transfer coupons, wherever "No transfer" would appear on the transfer coupon.

It will be understood that the ticket may be executed with any suitable form of punch and, while the ordinary Stromberg or similar punch is preferably employed, yet the ticket may be executed with a hand punch such as the ordinary L or similar punch.

I claim:

1. A railroad ticket comprising a plurality of coupons, of which the first passage coupon is provided with the name of the issuing or initial line of road repeated to form a column in a group and of which the last passage coupon is provided with the name of the terminal line or lines of road also repeated to form a column, the intermediate passage coupon or coupons being provided with the names of the intermediate or connecting lines of road arranged in a column and in a position on the coupon to register with the columns of initial and terminal lines of road on the other coupons when the ticket is folded; substantially as described.

2. A railroad ticket comprising a plurality of coupons, of which the first passage coupon is provided with the name of the initial line of road and the name of the first junction point or points repeated one above the other to form a column, and of which the last passage coupon is provided with the name of the terminal line or lines of road also repeated one above the other to form a column, the intermediate passage coupon or coupons being provided with a column of the names of the intermediate or connecting lines of road arranged to register with the columns of initial and terminal lines of road on the other coupons when the ticket is folded; substantially as described.

3. A railroad ticket comprising a plurality of coupons, of which the first passage coupon is provided with the name of the initial line of road and the name of the first junction point or points repeated one above the other to form a column, and of which the last passage coupon is provided with the name of the terminal line or lines of road also repeated one above the other to form a column, the intermediate passage coupon or coupons being provided with a column of the names of the intermediate or connecting lines of road and the names of their junction points, said last named column being arranged to register with the columns of initial and terminal lines of road on the other coupons when the ticket is folded; substantially as described.

4. A railroad ticket comprising a plurality of passage coupons, of which the first one is provided with the name of the issuing or initial line of road repeated and grouped with the name of the first junction point or points, with the name of the initial line followed in a straight line by the name of the junction point, the last passage coupon being provided with the name of the terminal line or lines of road repeated, and the intermediate passage coupon or coupons being provided with a group of the names of the intermediate or connecting line or lines of road in register with the groups of initial and terminal lines of road when the coupons are folded upon each other; substantially as described.

5. A railroad ticket comprising a plurality of passage coupons, the auditor's coupon and the agent's coupon, of which the two last mentioned coupons and the first passage coupon are provided with the name of the issuing or initial line of road repeated and followed by the name of a junction point or points in a straight line with such name of the initial line of road, and of which the last passage coupon is provided with the name of the terminal line or lines of road repeated, the intermediate passage coupon or coupons being provided with a group of the names of the intermediate connecting line or lines of road in register with the repeated name of the initial and terminal lines of road when the coupons are folded upon each other; substantially as described.

6. A railroad ticket comprising a plurality of passage coupons adapted to be executed from an initial line of road over any one of a plurality of intermediate or connecting lines of road to a destination on a terminal line of road, each of which coupons is provided with a complete route of the ticket, the first passage coupon being provided in addition, with the name of the initial line or lines of road and the first junction point or points repeated one above the other to form a column, the last passage coupon being provided in addition with the name of the terminal line or lines of road repeated one above the other to form a column, and the intermediate passage coupon or coupons being provided with the names of the intermediate or connecting lines of road one above the other to form a column registering with the columns of the initial and terminal roads on the other coupons when the ticket is folded; substantially as described.

7. A railroad ticket comprising a plurality of passage coupons adapted to be executed from an initial line of road over any one of a plurality of intermediate or connecting lines of road to a destination on a terminal line of road, and each of which coupons is provided with a list of destinations on the terminal line or lines of road, the first passage coupon being provided in addition with the name of the initial line of road and with the name of the first junction point or points repeated one above the other to form a column, the last passage coupon being provided in addition with the name of the terminal line or lines of road repeated one above the other to form a column, and the intermediate passage coupon being provided with the names of the intermediate or connecting lines of road and the names of the next series of junction points one above the other to form a column registering with the columns of the initial and terminal roads on the other coupons when the ticket is folded; substantially as described.

8. A railroad ticket adapted to be executed from an initial line of road over any one of a plurality of intermediate or connecting lines of road to a destination on a terminal line of road and comprising a plurality of passage coupons, the auditor's coupon and the agent's coupon, of which the two last named coupons are provided with a complete route of the ticket consisting of successive lists, in straight lines, of the lines of road and junction points comprised in the different available routes from the initial point to the destination, the name of the initial line of road being repeated in each list and appearing in a column, the first passage coupon being provided with a similar column of the name of the initial line of road repeated and arranged to register with the columns thereof on the agent's and auditor's coupons, the last passage coupon being provided with a column of the name of the terminal line or lines of road repeated and also arranged to register with said columns on the agent's and auditor's coupons, when the ticket is folded, and the intermediate passage coupon or coupons being provided with the names of the intermediate or connecting lines of road in a column adapted to register with said columns on the other coupons; substantially as described.

9. A railroad ticket adapted to be executed from an initial line of road over any one of a plurality of intermediate or connecting lines of road to a destination on a terminal line of road, and comprising a plurality of passage coupons, the auditor's coupon and the agent's coupon, of which the two last named coupons are provided with a complete route of the ticket consisting of successive lists, in straight lines, of the lines of road and junction points comprised in the different available routes from the initial point to the destination, the name of the initial line of road being repeated in each list and appearing in a column, said auditor's and agent's coupons being also provided with a list of destinations on the terminal line or lines of road, the first passage coupon being provided with a similar column of the name of the initial line of road repeated and arranged to register with the columns thereof on the agent's and auditor's coupons when the ticket is folded, the last passage coupon being provided with a column of the name of the terminal line or lines of road repeated and also arranged to register with said columns on the agent's and auditor's coupons, and the intermediate passage coupons being provided with the names of the intermediate or connecting lines of road in a column adapted to register with said columns on the other coupons; substantially as described.

10. A railroad ticket adapted to be executed from an initial line of road over any one of a plurality of intermediate or connecting lines of road to a destination on a terminal line of road and comprising a plurality of passage coupons, the auditor's coupon and the agent's coupon, each of which coupons is provided with a complete route of the ticket, the first passage coupon and the auditor's and the agent's coupons being provided with the name of the initial line of road and the first junction point repeated in a column as many times as there are available routes for which the ticket may be executed, the last passage coupon being provided with a column of the name of the terminal line or lines of road repeated and arranged to register with the said columns on the other coupons when the ticket is folded, and the intermediate coupon or coupons being provided with the names of the intermediate or connecting lines of road in a column adapted to register with said columns on the other coupons; substantially as described.

11. A railroad ticket adapted to be executed from an initial line of road over any one of a plurality of intermediate or connecting lines of road to a destination on a terminal line of road and comprising a plurality of passage coupons, the auditor's coupon and the agent's coupon, each of which coupons is provided with a complete route of the ticket, the first passage coupon and the auditor's and the agent's coupons being provided with the name of the initial line of road and the first junction point repeated in a column as many times as there are available routes for which the ticket may be executed, the last passage coupon being provided with a column of the name of the terminal line or lines of road repeated and arranged to register with the said columns on the other coupons when the ticket is folded, and the intermediate coupon or coupons being provided with the names of the intermediate or connecting lines of road in a column adapted to register with said columns on the other coupons, each of the coupons being provided with a list of destinations on the terminal line or lines of road, which lists on the different coupons register with each other, whereby by means of two punchings in said columns and said lists respectively, the ticket may be executed from a station on an initial line of road, via any one of a plurality of connecting lines, to a destination on a terminal line or lines of road with said complete route indicated on each coupon; substantially as described.

12. A railroad ticket comprising a plurality of coupons, of which the first passage coupon is provided with the name of the issuing or initial line of road repeated to form a column and of which the last passage coupon is provided with the name of the terminal line or lines of road also repeated to form a column, the intermediate passage coupon or coupons being provided with the names of the intermediate or connecting lines of road in a column registering with the columns of initial and terminal lines of road on the other coupons when the ticket is folded, said columns being conspicuous in comparison with the other portions of the coupons, whereby the reading of each coupon is facilitated; substantially as described.

13. A railroad ticket comprising a plurality of coupons, of which the first passage coupon is provided with the name of the issuing or initial line of road repeated to form a column and of which the last passage coupon is provided with the name of the terminal line or lines of road also repeated to form a column, the intermediate passage coupon or coupons being provided with the names of the intermediate or connecting lines of road in a column registering with the columns of initial and terminal lines of road on the other coupons when the ticket is folded, said columns being printed in bolder and blacker-faced type than the other parts of the coupons to distinguish the same therefrom whereby the reading of the route of each coupon is facilitated; substantially as described.

14. A railroad ticket comprising a plurality of passage and one or more transfer coupons, of which the first passage coupon is provided with the name of the initial line of road and the name of the first junction point repeated one above the other to form a column, and of which the last passage coupon is provided with the name of the terminal line or lines of road repeated one above the other to form a column, the intermediate passage coupon being provided with the names of the intermediate or connecting lines of road in a column registering with the columns of initial and terminal lines of road on the other coupons when the ticket is folded, and the transfer coupon being provided in corresponding position with the names of depots where transfers are necessary; substantially as described.

15. A railroad ticket comprising a plurality of passage and one or more transfer coupons, of which the first passage coupon is provided with the name of the initial line of road and the name of the first junction point repeated one above the other to form a column, and of which the last passage coupon is provided with the name of the terminal line of road repeated one above the other to form a column, the intermediate passage coupon being provided with the names of the intermediate or connecting lines of road in a column registering with the columns of initial and terminal lines of road on the other coupons when the ticket is folded, and the transfer coupon being provided in corresponding position with a column of the names of depots where transfers are necessary, all of said columns of names on the coupons being printed more conspicuously than the other parts thereof whereby the reading of the route of each individual coupon is facilitated; substantially as described.

16. A railroad ticket comprising a plurality of passage and one or more transfer coupons, of which the first passage coupon is provided with the name of the initial line of road and the name of the first junction point repeated one above the other to form a column, and of which the last passage coupon is provided with the name of the terminal line or lines of road repeated one above the other to form a column, the intermediate passage coupon being provided with the names of the intermediate or connecting lines of road in a column registering with the columns of initial and terminal lines of road on the other coupons when the ticket is folded, and the transfer coupon being provided in corresponding position with a column of the names of depots where transfers are necessary, said passage and transfer coupons being provided in addition with the complete route of the ticket; substantially as described.

ROBERT A. SMITH.

Witnesses:
FRANK E. WATKINS,
FERD. B. PHILPOTT.